United States Patent
Buchaca et al.

(10) Patent No.: US 12,450,893 B2
(45) Date of Patent: *Oct. 21, 2025

(54) OBJECT DETECTION WITH INSTANCE DETECTION AND GENERAL SCENE UNDERSTANDING

(71) Applicant: Apple Inc., Cupertino, CA (US)

(72) Inventors: Aitor Aldoma Buchaca, Bavaria-Bayern (DE); Andreas N. Moeller, Bayern (DE); Michael Kuhn, Bayern (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,214

(22) Filed: Jun. 26, 2023

(65) Prior Publication Data

US 2024/0005652 A1 Jan. 4, 2024

Related U.S. Application Data

(63) Continuation of application No. 16/986,737, filed on Aug. 6, 2020, now Pat. No. 11,727,675.

(Continued)

(51) Int. Cl.
*G06V 10/82* (2022.01)
*G06N 20/00* (2019.01)
(Continued)

(52) U.S. Cl.
CPC .............. *G06V 10/82* (2022.01); *G06N 20/00* (2019.01); *G06V 10/764* (2022.01); *G06V 20/20* (2022.01); *G06V 20/35* (2022.01); *G06V 20/64* (2022.01)

(58) Field of Classification Search
CPC ...... G06V 10/764; G06V 20/35; G06V 20/64; G06V 20/20; G06V 10/82; G06V 20/60; G06N 3/0464; G06N 20/00; G06N 3/08
See application file for complete search history.

(56) References Cited

U.S. PATENT DOCUMENTS 9,327,406 B1  5/2016  Hinterstoisser et al.
10,346,709 B2  7/2019  Guerreiro et al.
(Continued)

FOREIGN PATENT DOCUMENTS

CN  109658449 A  4/2019
EP  3171297  5/2017
(Continued)

OTHER PUBLICATIONS

Korean Intellectual Property Office, Notice of Preliminary Rejection (with English translation) issued Sep. 13, 2023 which pertains to Korean Patent Application No. 10-2023-0108387. 7 pages.

(Continued)

*Primary Examiner* — Congvan Tran
(74) *Attorney, Agent, or Firm* — Thompson Hine LLP

(57) ABSTRACT

Various implementations disclosed herein include devices, systems, and methods that determine a particular object instance in CGR environments. In some implementations, an object type of an object depicted in an image of a physical environment is identified. Then, a particular instance is determined based on the object type and the image. In some implementations, objects of the particular instance have a set of characteristics that differs from sets of characteristics associated with other instances of the object type. Then, the set of characteristics of the particular instance of the object depicted in the physical environment is obtained.

20 Claims, 8 Drawing Sheets

Related U.S. Application Data

(60) Provisional application No. 62/897,625, filed on Sep. 9, 2019.

(51) Int. Cl.
  G06V 10/764 (2022.01)
  G06V 20/00 (2022.01)
  G06V 20/20 (2022.01)
  G06V 20/64 (2022.01)

(56) References Cited

U.S. PATENT DOCUMENTS

| | | | |
|---|---|---|---|
| 10,984,607 B1 | 4/2021 | Wang | |
| 11,043,193 B2* | 6/2021 | Mak | G06F 3/013 |
| 11,106,327 B2 | 8/2021 | Mani et al. | |
| 2013/0093788 A1* | 4/2013 | Liu | G01C 21/365 345/633 |
| 2014/0267404 A1* | 9/2014 | Mitchell | G06T 19/006 345/633 |
| 2017/0200308 A1 | 7/2017 | Nguyen | |
| 2017/0206714 A1* | 7/2017 | Arcas | G06T 17/10 |
| 2017/0323488 A1 | 11/2017 | Mott et al. | |
| 2017/0358141 A1* | 12/2017 | Stafford | G06T 7/246 |
| 2018/0190022 A1 | 7/2018 | Zamir | |
| 2018/0350056 A1* | 12/2018 | Cardenas Bernal | G01N 21/954 |
| 2019/0050000 A1* | 2/2019 | Kennedy | G05D 1/102 |
| 2019/0066380 A1* | 2/2019 | Berk | G06F 3/012 |
| 2019/0094040 A1 | 3/2019 | Lewis | |
| 2019/0102946 A1 | 4/2019 | Spivack | |
| 2019/0347846 A1 | 11/2019 | Olson | |
| 2019/0354175 A1* | 11/2019 | Torkos | G06F 3/013 |
| 2019/0391726 A1 | 12/2019 | Iskandar | |
| 2020/0117335 A1* | 4/2020 | Mani | G06F 9/452 |
| 2020/0304375 A1* | 9/2020 | Chennai | G06V 20/10 |
| 2020/0342668 A1* | 10/2020 | Chojnacka | G06V 20/20 |
| 2021/0049901 A1 | 2/2021 | Young | |

FOREIGN PATENT DOCUMENTS

| | | |
|---|---|---|
| KR | 1020180058175 A | 5/2018 |
| KR | 1020180086639 A | 8/2018 |

OTHER PUBLICATIONS

U.S. Patent and Trademark Office, Non-Final Office Action, U.S. Appl. No. 16/986,737, 8 pages, Apr. 4, 2022.

U.S. Patent and Trademark Office, Notice of Allowance, U.S. Appl. No. 16/986,737, 6 pages, Dec. 14, 2022.

U.S. Patent and Trademark Office, Notice of Allowance, U.S. Appl. No. 16/986,737, 6 pages, Mar. 30, 2023.

Schwartz, Gabriel; Nishino, Ko; "Recongnizing Material Properties from Images"; arXiv: 1801.03127v1[cs:CV], pp. 1-14; Jan. 9, 2018.

Nesterenko, Ivan; "Realistic reflections and environment textures in ARKit 2.0"; pp. 1-4; Jun. 13, 2018.

Cai, Su; Wang, Xu; Gao, Mengnan; Yu, Shengquan; "Simulation Teaching in 3D Augmented Reality Environment", 2012 IIAI International Conference on Advanced Applied Informatics; Conference Paper, pp. 83-88; Sep. 2012.

Scheer, Fabian; Abert, Oliver; Muller, Stefan; "Towards Using Realistic Ray Tracing in Augmented Reality Applications with Natural Lighting"; University of Koblenz-Landau; pp. 1-8; 2007.

Ropinski, Timo; Wachenfeld, Steffen; Hinrichs, Klaus; "Virtual Reflections for Augmented Reality Environments"; ICAT 2004; pp. 1-8, 2004.

Smart Home, "GrokStyle Makes Finding the Perfect Furniture As Easy As Taking a Picture"; pp. 1-13; 2019.

Gupta, Saurabh, Arbelaez, Pablo; Girshick, Ross; Malik, Jiendra; "Indoor Scene Understanding with RGB-D Images, Bottom-up Segmentation, Object Detection and Sematic Segmentation"; pp. 1-16; Nov. 21, 2014.

New World Notes; Wagner James Au reports on Virtual Worlds & VR; "iOS' ARKit Enables Reflection of Real Objects on Virtual Surfaces"; pp. 1-3; Jun. 12, 2018.

Mori, Shohei; Ikeda, Sei; Saito, Hideo; "A survey of diinished reality: Techniques for visually concealing, eliminating, and seeing through real objects"; IPSJ Transactions on Computer Vision and Applications; 2017, pp. 1-14.

Korean Intellectual Property Office, Notice of Preliminary Rejection (with English translation), Korean Patent Application No. 10-2020-0112155, 10 pages, Apr. 26, 2022.

Korean Intellectual Property Office, Notice of Preliminary Rejection (with English translation), Korean Patent Application No. 10-2020-0112155, 7 pages, Nov. 14, 2022.

China National Intellectual Property Administration, Notification of the First Office Action (with partial English Translation), Chinese Patent Application No. 202010938753.2, 12 pages, Apr. 26, 2024.

Korean Intellectual Property Office, Notice of Preliminary Rejection (with English translation), Korean Patent Application No. 10-2024-0108819, 7 pages, Jun. 9, 2025.

China National Intellectual Property Administration, Board Opinion (with English translation), Chinese Patent Application No. 202010938753.2, 7 pages, Jul. 10, 2025.

* cited by examiner

OBJECT DETECTION WITH INSTANCE DETECTION AND GENERAL SCENE UNDERSTANDING

CROSS-REFERENCE TO RELATED APPLICATIONS

This application is a continuation of U.S. patent application Ser. No. 16/986,737 filed Aug. 6, 2020, which claims the benefit of U.S. Provisional Application Ser. No. 62/897,625 filed Sep. 9, 2019, each of which is incorporated herein by this reference in its entirety.

TECHNICAL FIELD

The present disclosure generally relates to electronic devices, and in particular, to systems, methods, and devices that provide computer generated reality (CGR) environments based on images of physical environments.

BACKGROUND

CGR environments may be created based on images of a physical environment. For example, a device may capture images of a physical environment and add virtual content amongst the physical objects in a CGR environment that is presented to a user. Existing techniques for detecting objects, identifying instances of objects, and generally understanding the physical environment may be improved with respect to efficiency and accuracy.

SUMMARY

Various implementations disclosed herein include devices, systems, and methods that provide scene understanding of the physical environment that is used to provide a CGR environment. The scene understanding is based on detecting one or more particular physical objects (e.g., brand x chair, model y) present in the physical environment. The object instance is detected by first detecting an object and its type (e.g., a chair is detected using a first neural network) and then performing instance detection guided by the object type, for example, using a second neural network to identify chair model number or performing a visual search using features extracted, for example from within a bounding box around the table, in the current camera image. Implementations disclosed herein may combine object detection with instance detection in various ways. In various implementations, the instance detection of an identified object type is used to access a set of characteristics (e.g., dimensions, material properties, etc.) for instances of an identified object type. In some implementations, the CGR environment is provided based on the instance detection, for example, by combining one or more of the set of characteristics to modify the CGR environment.

In some implementations, object detection detects and identifies an object type for objects in images of a physical environment using a first machine learning model. For example, object detection detects and identifies an object type (e.g., table, couch, chair, etc.) for furniture objects in images of a physical environment of a room. Then, in some implementations, instance detection uses a second machine learning model trained for that object type (e.g., table), and inputs distinct features from images of the physical environment of the detected object to determine a precise model or particular instance of the object type (e.g., table brand model xyz1). In various implementations, objects of the particular instance have a set of characteristics that differs from sets of characteristics associated with other instances of the object type.

Some implementations use a database of instances of the identified object type (e.g., tables). The determined particular instance (or the specific brand model identifier xyz1) may be used to access (e.g., via an index) a variety of information or set of characteristics such as materials, dimensions, colors, etc. of that determined particular instance (e.g., table xyz1). In some implementations, the determined particular instance from instance detection is used to access a robust description of that particular instance (e.g., table xyz1) of the identified object type (e.g., table). In some implementations, one or more of the set of characteristics obtained for that determined particular instance are combined with the CGR environment. In some implementations, the one or more of the set of characteristics obtained for that determined particular instance (e.g., table brand model identifier xyz1) are used for scene understanding, scene reconstruction, or material detection in the CGR environment. In some implementations, the one or more of the set of characteristics obtained for that specific table model xyz1 are used to improve the quality of the CGR environment.

In some implementations, the instance detection after object type identification is used for environment texturing (e.g., reflecting real objects in virtual objects) in the CGR environment. In some implementations, the instance detection is used for reflecting virtual objects on real objects in the CGR environment. In some implementations, the instance detection is used for determining physical properties of real objects for enhanced physics simulation (e.g., friction of a surface, bounce behavior for an object, or audio reflectivity) in the CGR environment. In some implementations, the instance detection is used for generating a high-quality scene or object reconstruction (e.g., without visual data of the entire object) using precise object or plane boundaries (e.g., dimensions) in the CGR environment (e.g., for occlusion handling and physics simulation). In some implementations, the instance detection is used for diminished reality (e.g., removing or replacing real objects) in the CGR environment. In some implementations, the instance detection is used for understanding the light situation (e.g., position, color, or direction of light sources) in the CGR environment.

Various implementations disclosed herein include devices, systems, and methods that determine a particular object instance in CGR environments. In some implementations, an object type (e.g., table) of an object depicted in an image of a physical environment (e.g., interior room) is identified. In some implementations, a particular instance (e.g., table brand model identifier xyz1) is determined based on the object type and distinct features of the object in the image of the physical environment. Then, the set of characteristics of the determined particular instance of the object depicted in images of the physical environment is obtained using the determined particular instance to perform a lookup in a database of instances of that object type (e.g., table). In some implementations, objects of the particular instance have a set of characteristics (e.g., dimensions, color, materials) that differs from sets of characteristics associated with other instances (e.g., table brand model identifier abc4, table brand model identifier klm11) of the object type. In some implementations, the instance detection is used in a CGR environment by combining one or more of the set of characteristics of the determined particular instance (e.g., table brand model identifier xyz1) with the CGR environment.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
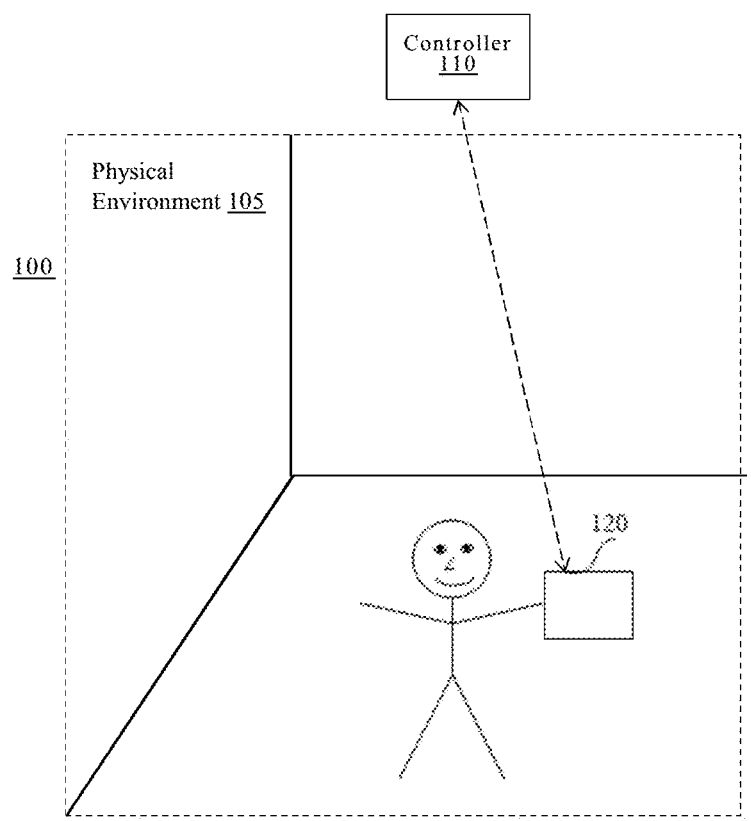
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
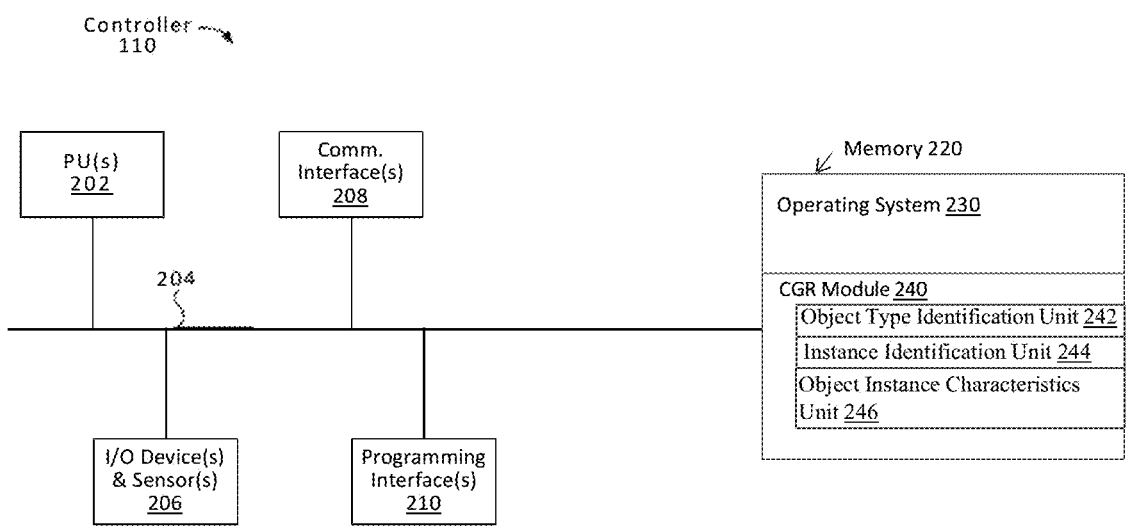
FIG. 2 is a block diagram of an example controller in accordance with some implementations.
Figure 3:
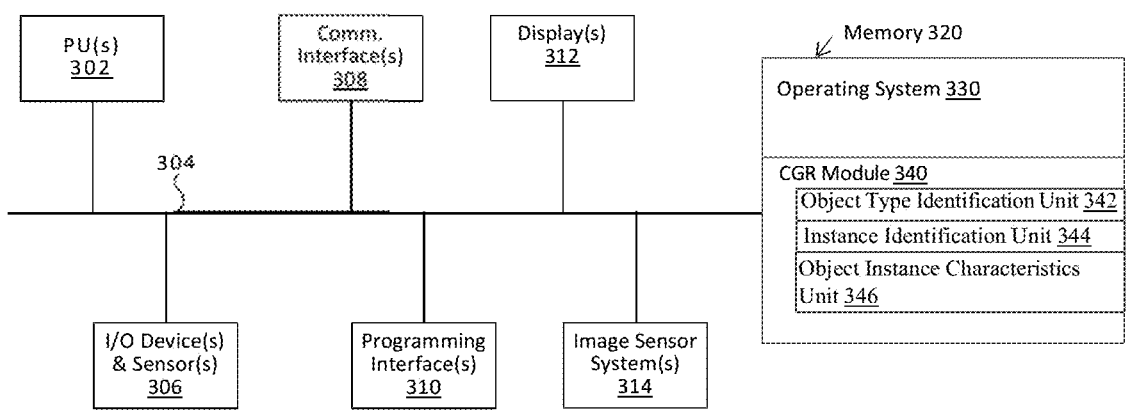
FIG. 3 is a block diagram of an example electronic device (e.g., head-mounted device (HMD)) in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving an electronic device, other implementations may involve other types of devices including, but not limited to, watches and other wearable electronic devices, mobile devices, laptops, desktops, gaming devices, head mounted device (HMD), home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) environment for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

In some implementations, the controller 110 and the electronic device 120 are configured to present the CGR environment to the user together.

In some implementations, the electronic device 120 is configured to present the CGR environment to the user. In some implementations, the electronic device 120 includes a suitable combination of software, firmware, or hardware. The electronic device 120 is described in greater detail below with respect to FIG. 3. In some implementations, the functionalities of the controller 110 are provided by or combined with the electronic device 120, for example, in the case of an electronic device that functions as a stand-alone unit.

According to some implementations, the electronic device 120 presents a CGR environment to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (CGRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) module 240.

The operating system 230 includes procedures for handling various basic system services and for performing hardware dependent tasks.

In some implementations, the CGR module 240 is configured to create, edit, present, or experience CGR environments. In some implementations, the CGR module 240 includes an object type identification unit 242, an instance identification unit 244, and an object instance characteristics unit 246. The object type identification unit 242 is configured to detect and identify an object type for objects in images of a physical environment. The instance identification unit 244 is configured to input distinct features from images of the physical environment of the detected object to determine a particular instance of the object type. The object instance characteristics unit 246 is configured to obtain the set of characteristics of the determined particular instance of the object type depicted in images of the physical environment. The CGR module 240 is configured to present virtual content (e.g., 3D content) that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

The memory 320 includes high-speed random-access memory, such as DRAM, CGRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR module 340.

The operating system 330 includes procedures for handling various basic system services and for performing hardware dependent tasks.

In some implementations, the CGR module 340 is configured to create, edit, present, or experience CGR environments. In some implementations, the CGR module 340 includes an object type identification unit 342, an instance identification unit 344, and an object instance characteristics unit 346. The object type identification unit 342 is configured to detect and identify an object type for objects in images of a physical environment. The instance identification unit 344 is configured to input distinct features from images of the physical environment of the detected object to determine a particular instance of the object type. The object instance characteristics unit 346 is configured to obtain the set of characteristics of the determined particular instance of the object type depicted in images of the physical environment. The CGR module 340 is configured to present virtual content (e.g., 3D content) that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4A:
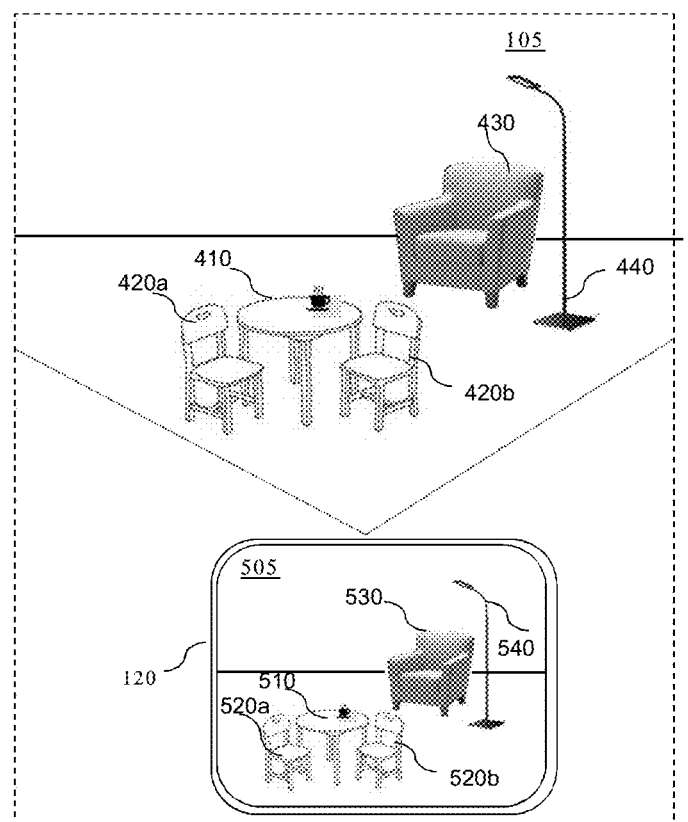
FIGS. 4A-4D are block diagrams illustrating using a particular instance of an identified object type in CGR environments in accordance with some implementations.

FIG. 4A is a diagram showing use of a particular instance of an identified object type in CGR environments in accordance with some implementations. In some implementations, real world items exist in the physical environment 105 and have corresponding representations in a CGR environment 505. As shown in FIG. 4A, a table 410, two chairs 420a, 420b, a sofa chair 430, and a lamp 440 exist in the physical setting 105. A table 510, two chairs 520a, 520b, a sofa chair 530, and a lamp 540 are concurrent real-time representations in the CGR environment 505 of the table 410, the two chairs 420a, 420b, the sofa chair 430, and the lamp 440. In some implementations, object detection is a one type of computer vision and image processing that deals with detecting instances of semantic objects of a certain type or class (e.g., humans, cars, etc.) in a digital image or digital images (e.g., videos). Every object type has its own special features that are used in classifying the object type. As shown in FIG. 4A, in some implementations, the object type is detected by first detecting an object (e.g., table 510) in an image (e.g., 2D or 3D) of the CGR environment 505 depicting the physical environment 105, and then analyzing the image to determine a type of the detected object (e.g., object type=table).

Figure 4B:
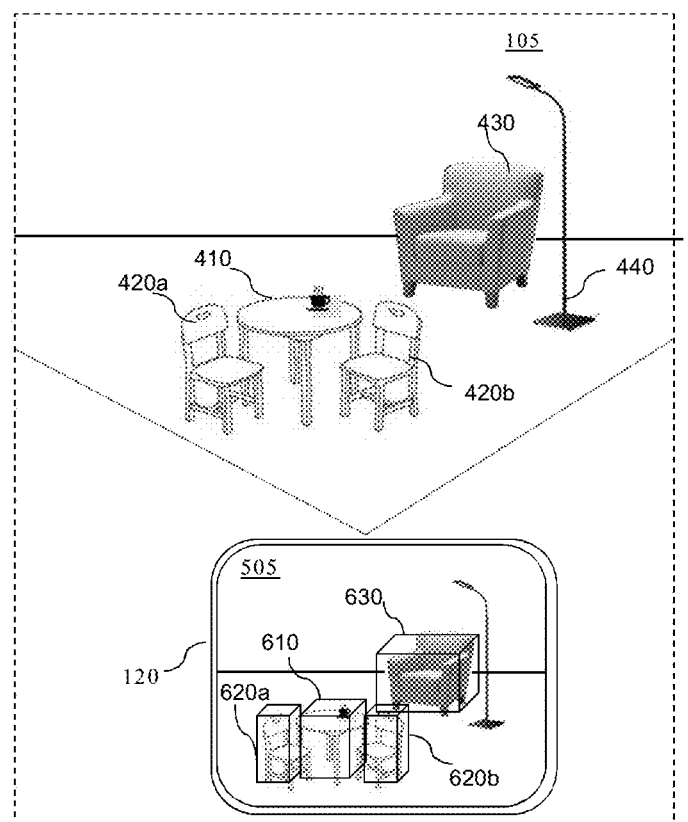

As shown in FIG. 4B, the table 510, the two chairs 520a, 520b, and the sofa chair 530 are detected in the CGR environment 505. In some implementations, detected object are located within a bounding box. As shown in FIG. 4B, the table 510, the two chairs 520a, 520b, and the sofa chair 530 are located by corresponding bounding boxes 610, 620a, 620b, and 630, respectively. In some implementations, once the object is detected in the image, the type of the object can be determined using machine learning (ML). ML methods for object detection include machine learning-based approaches or deep learning-based approaches. In some implementations, machine learning approaches, first define features from a set of data that contains both the inputs and the desired outputs, then using a classification technique to identify the object type. In some implementations, deep learning techniques do end-to-end object detection without specifically defining features, for example, using convolutional neural networks (CNN). In some implementations, the type of the object can be determined using a first neural network.

Figure 4C:
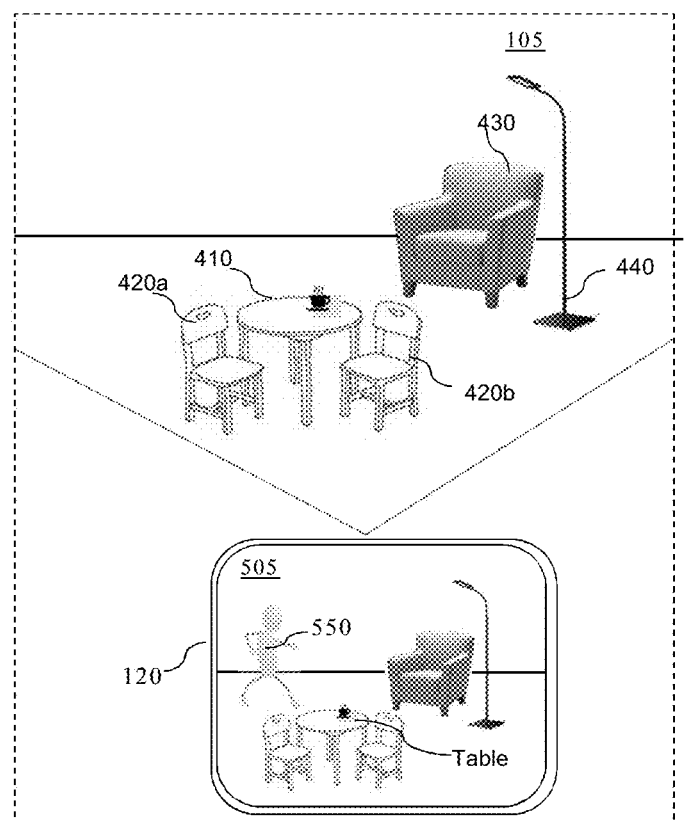

In some implementations, once the object type is determined, the object type can be labeled in the CGR environment 505 as shown in FIG. 4C. In some implementations, virtual objects can be added to the CGR environment 505 such as an avatar 550 shown in FIG. 4C.

Figure 4D:
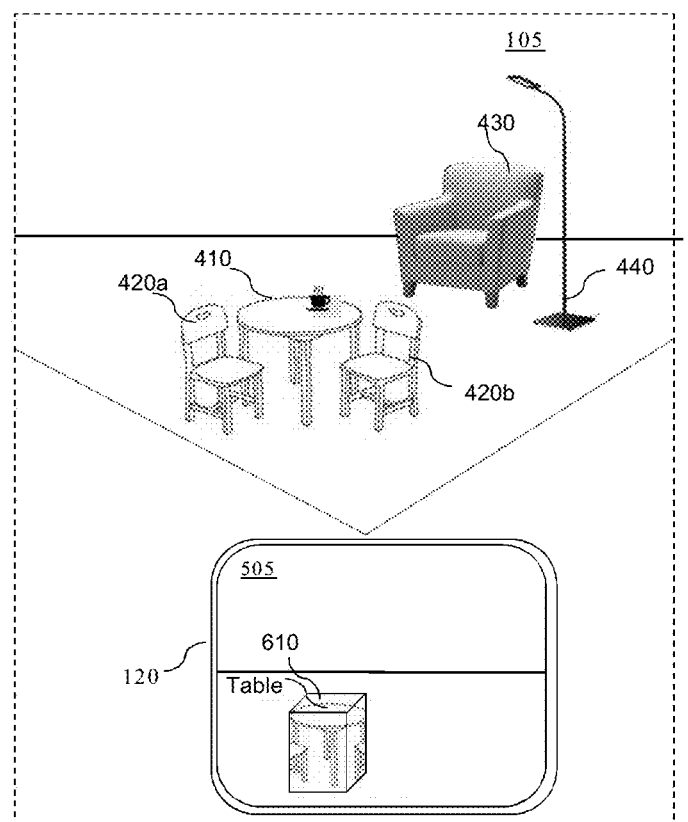

As shown in FIG. 4D, a particular instance is determined based on the object type (e.g., table) and the image (e.g., a portion 610 of the image). In some implementations, the object type includes a set of characteristics associated with the object type. In some implementations, each particular instance of the object type includes a unique instantiation of the set of characteristics that differs from sets of characteristics associated with other instances of the object type.

In some implementations, the particular instance (e.g., object type=table, brand model identifier=xyz1) is determined using a visual search. In some implementations, a 2D or 3D image (e.g., current image or portion thereof 610) from the device 120 can be used to extract features of the table 510. In some implementations, the extracted features are used to generate an abstract structure representation of the particular instance of the object type. In some implementations, the generated abstract structure representation can operate similar to a hash function that can be used to map data of arbitrary size onto data of a fixed size called a hash code. Hash functions are often used in combination with a hash table, which is a corresponding data structure addressed or accessed by the hash code for data lookup.

Once the abstract structure representation of the particular instance (e.g., the brand and model number of the table 410) is generated from the object type (table) and at least the portion of the image (the bounding box 610), that can be sent to a database of abstract structure representations encoded in the same manner. In some implementations, the database of abstract structure representations encoded in the same manner include the corresponding specific unique brand model identifier. In other words, the abstract structure representation created by the visual search is used to index a database of existing specific brand models organized by the object type to output 1 corresponding brand model identifier (e.g., number or alphanumeric code, etc.).

ML approaches can also be used to create such databases of existing specific instances of brand models by extracting and encoding distinct features of particular instances of the object type in the current CGR environment 505, and for comparing the extracted encoded distinct features to a set of encoded particular instances of the object type being searched. Thus, in some implementations, a dedicated ML network can be used for instance detection.

In some implementations, the database of existing specific instances of brand models returns the closest match to the input abstract structure representation. In some implementations, the database of existing specific instances of brand models returns a set of closest matches (e.g., 3, 5, 25, etc.) in response to the abstract structure representation being input.

In some implementations, such databases of existing specific instances of brand models encoded using visual search methods (e.g., distinct features description) are already created and stored ahead of time. In some implementations, the abstract structure representation and databases of existing specific instances of object types are proprietary.

Thus, in some implementations, each object type uses a corresponding object instance identifier. In some implementations, a plurality of corresponding object instance identifiers exist. In some implementations, a plurality of corresponding object instance identifiers exist where a single corresponding object instance identifier exists for each identifiable object type in the CGR environment.

Once the brand and model number for the determined particular instance of the table 410 (e.g., specific object type brand model identifier) is returned from the database query, that brand model identifier is used to retrieve the entire set of characteristics of that brand model identifier. For example, the determined particular instance of the table 410 is identified to be brand model identifier xyz1, and the brand model identifier xyz1 is used to access the preset or known set of characteristics of the table xyz1 (e.g. dimensions, materials, physical properties).

In some implementations, one or more of the set of characteristics from the instance detection is combined with other information at the CGR environment. Thus, one or more of dimensions, color, materials composition or the like from the set of characteristics resulting from the instance detection is combined or used at the CGR environment.

In some implementations, the instance detection after object detection is used for environment texturing (e.g., reflecting real objects in virtual objects or reflecting virtual objects on real objects) in the CGR environment. For example, the instance detection identifies the material properties of objects in the physical environment that can be used to determine the reflection characteristics of planes in the CGR reconstruction. In some implementations, the instance detection is combined with scene reconstruction at the CGR environment, for example, to improve a 3D spatial understanding using dimensions or color returned by instance detection. Further, the identified object type (e.g., table, chair, couch etc.) can be used with the material characteristics.

In some implementations, the instance detection after object detection is used for determining physical properties of real objects for enhanced physics simulation (e.g., friction of a surface, bounce behavior for an object, actual boundaries, or audio reflectivity) in the CGR environment.

In some implementations, the instance detection after object detection is used for generating a high-quality scene or object reconstruction in the CGR environment without visual data (e.g., of an entire detected object). In some implementations, the instance detection is performed without image data of an entire detected object. For example, a couch brand model identifier for a couch in the physical environment can be provided from less than half of the physical couch being reconstructed in the CGR environment. At that point in time, the instance detection can provide a complete 3D model of the entire couch, which allows for CGR environment reconstruction without visual data of the entire object. In another example, a chair brand model identifier is provided using the object type "chair" and images of the backrest and some legs of the chair, where the is chair pushed in at a table in the physical environment where the seat of the chair is under the table and cannot be captured in an image of the physical environment. At that point in time, the instance detection of the chair brand model identifier can provide a complete 3D model of the entire chair including the seat or the seat cover, which allows for CGR environment reconstruction without ever being able to have corresponding visual data.

In some implementations, the instance detection after object detection provides improved or very precise object or plane boundaries (e.g., obtaining dimensions via the brand model identifier). In some implementations, the instance detection provides increased accuracy for occlusion handling (e.g., obtaining dimensions via the brand model identifier) in the CGR environment reconstruction of the physical environment or in the occlusion handling between virtual objects and real object in the CGR environment. In some implementations, the instance detection provides increase accuracy in physics simulations in the CGR environment. In some implementations, the instance detection can reduce or remove noise in the CGR environment by reducing reconstruction of clutter when knowing the characteristic of an object covered by loose items or clutter, or knowing a color pattern of an object (e.g., couch, chair, etc.) can provide improved 3D reconstruction when viewing items inform of the patterned instance detected object.

In some implementations, the instance detection after object detection provides diminished reality at the CGR environment (e.g., removing real objects from the reconstructed physical environment). In some implementation, diminished reality can virtually place a new piece of furniture (e.g., a virtual couch) into an indoor room CGR environment after first virtually removing the existing couch (e.g., a reconstruction of an actual couch in the physical environment). In some implementations, the instance detection provides properties (dimensions, colors, information about non-visible areas, etc.) of the actual object reconstruction to be removed. For example, instance detection can provide information about the backside of the couch facing a wall that could never be provided by a pure on-device reconstruction (e.g., simultaneous localization and mapping (SLAM)). In some implementations, the instance detection provides additional information about surrounding or nearby objects in the CGR environment that improve or increase an accuracy in the 3D spatial understanding of the physical environment or in-painting around the real object to be virtually removed.

In some implementations, the instance detection after object detection provides additional information about lighting in the physical environment (e.g., position or direction of light sources) that can make shadows or 3D spatial positioning more accurate. In some implementations, the instance detection after object detection provides additional information about the lighting in the physical environment because a color of an brand model identified object type can be compared to its reconstructed color in the CGR environment. For example, a white patterned couch may appear tinted (e.g., yellowish) in the CGR environment and allow color correction for a portion or the entire CGR environment. In addition, knowing position, color, or direction of light sources can be used in diminished reality to reduce or remove shadows that the real object is casting in the real world physical environment.

Figure 5:
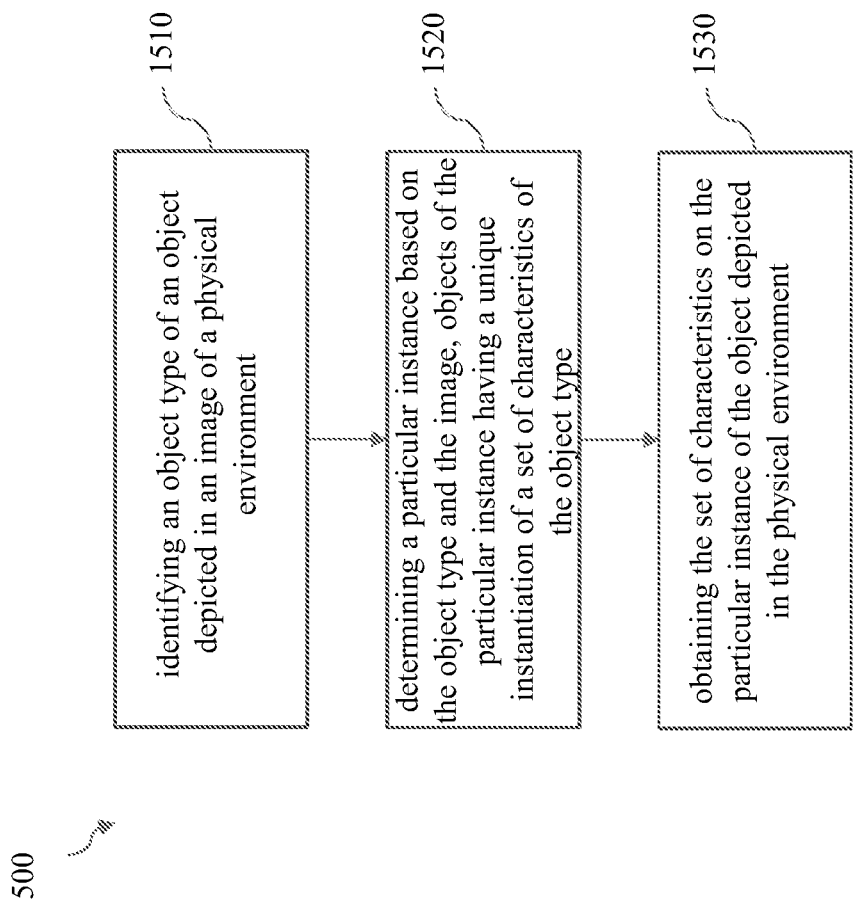
FIG. 5 is a flowchart illustrating an exemplary method of modifying a CGR environment based on a particular instance of an object type in accordance with some implementations.

FIG. 5 is a flowchart illustrating an exemplary method of determining a set of characteristics of a particular instance of a type of object in CGR environments according to some implementations. In some implementations, the method 500 is performed by a device (e.g., controller 100 or electronic device 120 of FIGS. 1-3). The method 500 can be performed for CGR environments using an electronic device or by multiple devices in communication with one another. In some implementations, the method 500 is performed by processing logic, including hardware, firmware, software, or a combination thereof. In some implementations, the method 500 is performed by a processor executing code stored in a non-transitory computer-readable medium (e.g., a memory).

At block 1510, the method 500 identifies an object type of an object depicted in an image of the physical environment is identified. In some implementations, the object type is detected by first detecting an object in the image of the physical environment and then determining a type of the detected object (e.g., a chair, sofa, table, wall or the like). In some implementations, once the object is detected in the image, the type of the object can be determined using model learning (ML). In some implementations, once the object is detected in the image, the type of the object can be determined using methods such as machine learning-based approaches or deep learning-based approaches. In some implementations, the type of the object can be determined using a first neural network.

In some implementations at block 1510, the image of the physical environment is obtained using a sensor (e.g., camera) on an electronic device (e.g., HMD) having a processor. In some implementations, the image is a 2D image or a 3D image. In some implementations, the sensor can be a RGB camera, a depth sensor, a RGB-D camera, one or more 2D cameras, IR cameras, or the like. In some implementations, combinations of sensors are used. In some implementations, the sensor is used to generate a CGR environment representing the physical environment. In some implementations, the CGR environment is generated using Visual Inertial Odometry (VIO) or SLAM position tracking or the like at the electronic device. In some implementations, color images can be used. Alternatively, in some implementations, grayscale images can be used.

At block 1520, the method 500 determines a particular instance based on the object type and the image of the physical environment. In some implementations, the object type includes a set of characteristics associated with the object type. In some implementations, each particular instance of the object type includes a unique instantiation of the set of characteristics that differs from sets of characteristics associated with other different instances of the object type. In some implementations, distinct features of the object in the image of the physical environment and the object type can be used to determine the single particular instance of the object type. In some implementations, distinct features of the object in the image of the physical environment and the object type can be used to identify particular instances of the object type. In some implementations, machine learning can be used to determine the particular instance (e.g., instance detection) of the object type (e.g., using the object type and distinct features of the object in the image(s)). In some implementations, a machine learning model can be used that inputs the object type and image/image portion to output (e.g., determine) one particular instance of the object type. In some implementations, a second neural network trained for one of a plurality of object types (e.g., object type="table") can be used to identify a specific "table" brand model identifier from an input representation (e.g., abstract representation) generated using the object type and distinct features of the object obtained from the image. In some implementations, a visual search using features extracted from within a bounding box around the detected object of the identified object type (e.g., table) in the current camera image can be performed on a database formed of representations of instances of the object type "table". In some implementations, features (e.g., to determine a particular instance or particular brand model identifier) are extracted from a portion of the image depicting the detected object of the object type.

At block 1530, the method 500 obtains the set of characteristics of the particular instance of the object of the identified object type determined to be depicted in the image of the physical environment. In some implementations, the set of characteristics of the determined particular instance are obtained by indexing or accessing a database to identify information (e.g., the set of characteristics) about visual and physical properties (e.g., materials, dimensions, etc.) of the determined particular instance of the identified object type. In some implementations, the determined particular instance of the identified object type includes determined particular instance (e.g., determined brand ("American Heritage") and model instance identifier ("model AH-500-252J1") of the identified object type ("table").

In some implementations, the set of characteristics of the determined particular instance may be combined with other information at the CGR environment. In some implementations, the set of characteristics may be combined with other information about the CGR environment to provide (1) a modified or improved scene understanding; (2) a modified or improved scene reconstruction; or (3) a modified or improved material detection in the CGR environment. In some implementations, the method 500 may be used to provide CGR environment texturing, CGR reflections, CGR physics simulations, reconstructed CGR object portions not in the image, CGR object/plane boundaries, or removal of real objects in the CGR environment.

In some implementations at block 1530, the database of existing specific instances of an object type indexed or accessed using the determined particular instance (e.g., abstract representation) of the object type returns the closest match (e.g., a single exact match) to the determined particular instance that is input. In some implementations, the database of existing specific instances of an object type indexed or accessed using the determined particular instance (e.g., abstract representation) returns a set of closest matches (e.g., 3, 5, 25, etc.) in response to determined particular instance that is input.

For example in some implementations at block 1530, a "table" type determined brand model instance identifier is input to a "table" type instance detection database and a set of (4) tables, namely table A, table B, table C, and table D are returned with confidence values of 70%, 20%, 7%, and 3%, respectively. In various implementations, the method 500 can attempt to gain additional information for increased certainty, accept a level of uncertainty, or allow for user input. In one example, where the instance detection is being used for physics simulation (e.g., reflectance) and tables A-D have similar reflectance, one reflectance value (or averages reflectance values) of tables A-D can be used in the CGR environment. In this example, a correct reflectance value is used in the CGR environment and no single determined particular instance (e.g., exact match) results. In another example where table A, table B, table C, and table D are returned as described above, the user can be notified to move a specific direction or scan in a specific direction to obtain images of more of the actual table in the physical environment, which results in additional information about (e.g., distinct features) the actual table, until the instance detection returns the single determined particular instance (e.g., exact match) for the actual table in the physical environment. In yet another example where table A, table B, table C, and table D are returned as described above, the most likely result being table A is selected and used in the CGR environment. In still yet another example where table A, table B, table C, and table D are returned as described above, the user can be presented with the four choices and allowed to select 1 among the set (or none) for use in the CGR environment.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at an electronic device having a processor:
identifying an object type of an object depicted in an image of a physical environment;
determining a particular instance of the object based on the object type and the image, objects of the particular instance having a set of characteristics that differs from sets of characteristics of other instances of the object type;
obtaining the set of characteristics of the particular instance of the object depicted in the physical environment; and
combining the set of characteristics of the particular instance of the object with a CGR environment depicting the physical environment.

2. The method of claim 1, wherein identifying the object type of the object depicted in an image includes detecting the object type of a plurality of object types of the object in the image using a first machine learning model.

3. The method of claim 1, wherein determining a particular instance of the object based on the object type and the image comprises using features extracted from a portion of the image depicting the object to generate a representation of the particular instance of the object; and
determining the particular instance using the representation.

4. The method of claim 3, wherein determining the particular instance using the representation comprises:
querying a first database of instances of the object type using the representation; and
receiving the particular instance from the first database.

5. The method of claim 4, wherein obtaining the set of characteristics of the particular instance of the object depicted in the physical environment comprises accessing a database to receive information on materials, dimensions, physical properties, or visual properties of the particular instance of the object.

6. The method of claim 3, wherein determining the particular instance using the representation comprises using a second machine learning model that inputs the object type and the representation of the particular instance of the object and outputs the particular instance of the object.

7. The method of claim 6, wherein obtaining the set of characteristics of the particular instance of the object depicted in the physical environment comprises accessing a database to receive information on materials, dimensions, physical properties, or visual properties of the particular instance of the object.

8. The method of claim 1, wherein combining the set of characteristics of the particular instance of the object with the CGR environment depicting the physical environment comprises using the set of characteristics of the particular instance of the object to perform environment lighting in the CGR environment depicting the physical environment.

9. The method of claim 1, wherein combining the set of characteristics of the particular instance of the object with the CGR environment depicting the physical environment comprises using the set of characteristics of the particular instance of the object to perform scene understanding of the CGR environment depicting the physical environment.

10. The method of claim 1, wherein combining the set of characteristics of the particular instance of the object with the CGR environment depicting the physical environment comprises using the set of characteristics of the particular instance of the object to perform scene reconstruction in the CGR environment depicting the physical environment.

11. The method of claim 1, wherein combining the set of characteristics of the particular instance of the object with the CGR environment depicting the physical environment comprises using the set of characteristics of the particular instance of the object to perform material detection in the CGR environment depicting the physical environment.

12. The method of claim 1, wherein combining the set of characteristics of the particular instance of the object with the CGR environment depicting the physical environment comprises using the set of characteristics of the particular instance of the object to perform environment texturing in the CGR environment depicting the physical environment.

13. The method of claim 1, wherein combining the set of characteristics of the particular instance of the object with the CGR environment depicting the physical environment comprises using the set of characteristics of the particular instance of the object to generate reflections of virtual objects in the CGR environment or reflections of real objects of the CGR environment in the virtual objects of the CGR environment depicting the physical environment.

14. The method of claim 1, wherein combining the set of characteristics of the particular instance of the object with the CGR environment depicting the physical environment comprises using the set of characteristics of the particular instance of the object to perform physics simulations in the CGR environment depicting the physical environment.

15. The method of claim 1, wherein combining the set of characteristics of the particular instance of the object with the CGR environment depicting the physical environment comprises using the set of characteristics of the particular instance of the object to reconstruct object portions in the CGR environment that are not in the image depicting the physical environment.

16. The method of claim 1, wherein combining the set of characteristics of the particular instance of the object with the CGR environment depicting the physical environment comprises using the set of characteristics of the particular instance of the object to determine object or plane boundaries in the CGR environment depicting the physical environment.

17. The method of claim 1, wherein combining the set of characteristics of the particular instance of the object with the CGR environment depicting the physical environment comprises using the set of characteristics of the particular instance of the object to effect removal of real objects from the CGR environment depicting the physical environment.

18. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
identifying an object type of an object depicted in an image of a physical environment;
determining a particular instance of the object based on the object type and the image, objects of the particular instance having a set of characteristics that differs from sets of characteristics of other instances of the object type;

obtaining the set of characteristics of the particular instance of the object depicted in the physical environment; and combining the set of characteristics of the particular instance of the object with a CGR environment depicting the physical environment.

19. A non-transitory computer-readable storage medium, storing program instructions computer-executable on a computer to perform operations comprising:

identifying an object type of an object depicted in an image of a physical environment;

determining a particular instance of the object based on the object type and the image, objects of the particular instance having a set of characteristics that differs from sets of characteristics of other instances of the object type;

obtaining the set of characteristics of the particular instance of the object depicted in the physical environment; and combining the set of characteristics of the particular instance of the object with a CGR environment depicting the physical environment.

20. The non-transitory computer-readable storage medium of claim 19, wherein determining a particular instance of the object based on the object type and the image comprises using features extracted from a portion of the image depicting the object to generate a representation of the particular instance of the object; and determining the particular instance using the representation.

* * * * *